UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

ART OF FILLING SHOES.

1,227,502.      Specification of Letters Patent.      Patented May 22, 1917.

No Drawing.      Application filed April 1, 1912. Serial No. 687,937.

*To all whom it may concern:*

Be it known that I, ANDREW THOMA, a citizen of the United States, and resident of Cambridge, in the county of Middlesex and State of Massachusetts, have invented an Improvement in the Art of Filling Shoes, of which the following description is a specification.

As will be more apparent from the description later on, this patent relates to my previous method Patents 808,224, of December 26, 1905, and 1,118,161 of November 24, 1914, and in certain features is subordinate to my foundation Patent No. 832,002 of September 25, 1906, and to the patents which are ancillary to said foundation patent or for different species and improvements of the same general kind of filler, including my Patents 861,555 of July 30, 1907, the copending Patent 945,294 of January 4, 1910 (and Patent No. 855,868 of June 4, 1907 when employed as a binder for shoe filler), and more particularly to my Patents 1,032,312 of July 9, 1912, and to the several divisions and continuations of the last mentioned patent, and to my other filler patents copending with various of the aforesaid patents.

The present invention relates to a process of filling the bottom cavities of shoes with filler containing a firm-setting component in solution such as water-absorbing ingredients in an aqueous solution, or at least in a relatively slow-drying solvent capable of being evaporated. For example, various attempts have been made to use ordinary flour and starch pastes mixed with comminuted material such as ground cork to form a filler, but such fillers are so slow-drying that the filler layer thereof remains sensitive to injury from external objects while the shoes are lying on their racks drying, and for the same reason layers of such fillers are liable to drop out from the shoe cavities, and such fillers cause a serious delay in the progress of the work in the shoe factory, which work has to be held back until the filled cavities have become dry enough not to become disturbed by the welt-cementing process and subsequent sole-laying, and finally they eventually dry out so hard or board-like and unyielding that they injure the flexibility of the shoe and tend in many instances to break and eventually to crumble in use. I have discovered that by incorporating with such water-softened ingredients, heat-responsive softening ingredients, and then using heating means, preferably a heated applying tool, all the above objections are substantially overcome and certain surprising advantages result. First, the heated tool heats the softening portions of the filler, which is usually and preferably a sticky component, so as to make the mass more readily yielding under the leveling tool. Second, the heated tool overcomes, during the laying process, the dulling influence of the moisture-holding ingredient on the filler and develops the stickiness or otherwise renders active the beneficial properties of the softening component. The watery paste, for instance, acts normally to dull the sensitiveness of the sticky, pitchy or gummy component, and the application of the heated tool over the top of the filler removes or evaporates the water from the top layer so as to bring to the surface and expose directly the sticky component, thereby providing better adhesion and cohesion for the mass at that particular moment when these qualities are most essential. Third, the heated tool acts to sear or cake (*i. e.* stiffen) the top surface of the pasty component like an incipient crust by drying out the water on the surface and to some extent within the mass of the filler layer in the shoe-cavity as the heated blade or tool passes across the surface of said layer, and this takes place at the very instant when said tool is operated to level said top surface down perfectly smooth. In other words, this step in the process serves to perpetuate the effect or result of the leveling process and maintain the filler down smooth after it has once been smoothed by the tool. Fourth, the heated tool is kept clean and sleek by the waxy, gummy and sticky component, so that it does not get coated by the incrusting thereon of the pasty particles, which it nevertheless sears when it contacts with them. While I prefer to carry out my invention in all the details herein set forth, thereby getting all of the above principal advantages, I wish it understood that, as pointed out in certain of the claims hereinafter contained, the invention may be embodied in and be present in some of its features without the others, resulting in effecting some of the advantages without the others. For instance, if the softening means is such as olein oil and glycerin, and therefore not waxy or sleek merely because of the heat but also because of this oily or fatty softening element, the application of heat as explained will evaporate the water solvent or other volatile solvent and thereby hasten the setting of the top surface or face of the filler layer. Also, in addition to applying the waxy or pitchy and sticky medium as a component of the filler as such, it may be likewise applied to the tool and by the tool to the filler layer. And this application of the wax to the tool or roll and thereby to the filler may, with some fillers and in some cases, but with less beneficial results, be used instead of having the waxy component mixed into the filler. For instance, if a hot roll is used as the heat-conveying leveling medium, this roll may be waxed or oiled or similarly treated so that it not only conveys the heat to the top surface of the filler layer as desired and prevents the incrusting of the dried-out paste onto the roll, but it unites with the top portion of the filler layer a thin skim or extra sticky portion of the softening ingredient for giving the filler layer the desired pliability and moisture-resisting properties. Broadly considered, this feature is a continuation of my copending application Serial No. 550,802, filed March 21, 1910. In other words, the heated tool or blade may be relied upon for carrying out this step of the process from either one (or both together) of two standpoints, either (a) by developing the stickiness, waterproofing, etc., in the filler itself from the latent ingredients, or (b) by introducing said qualities into the top surface of the filler layer for facilitating the sole-laying and giving permanent improvement to the laid filler itself, such as durability, pliability, waterproofing, adhesiveness, etc., according to whatever ingredient may be used. The range of ingredients or chemical substances coming within the purview of my invention is set forth in my copending application Serial No. 432,083 (now Patent No. 1,032,312, July 9, 1912) and the patents and applications therein referred to. My invention is particularly advantageous with a filler in which the firm-setting component in solution (i. e. containing a solvent capable of being driven off by heat so as to leave the firm-setting component in a more or less firmly set condition) is paramount or predominant. For instance, my invention is advantageous with a filler in which the comminuted material is mixed with a smooth solution of jellified starch such as apparatine, or starch in solution such as arabol, or a solution of natural gums such as gum tragacanth, gum arabic, or the like mucilaginous or gelatinous solutions. I include in the latter group of solutions the silicates of soda, potash, etc. Likewise my invention is advantageous with any of the sticky resinous materials mentioned in my patents and applications above referred to, or with solutions of the same suitable for forming the sticky waxy component and fluxing it with the mucilaginous pasty component. The moisture-swelled or jellified pastes, or at least the moisture-laden firm-setting component serves to keep separated minute parts of the finely subdivided sticky gummy or tarry component (if used), thereby rendering the adhesive or sticky principle of the latter inactive, but as soon as the water has evaporated from the paste or stiffener or firm-setting compound, the latter can no longer repel the particles of the sticky gummy component within the filler body, and hence a union takes place which is of great value in effecting the results sought. This evaporation of the solvent by the local application of heat or a heated tool and rendering active thereby the previously dulled sticky waxy or gummy component releases, as it were, this previously restrained or dulled sticky component, which therefore causes the latter to penetrate or permeate or sweat through the entire layer, particularly at the top surface thereof which is to receive the sole. In practice, the tool bears down upon the filler layer and operates to force to the top the mobile binding fluid, the waxy component thereof which is contained in the solution being hyper-fluidified by the heat. This also brings to the front the waterproof principle of the filler which may have thus far been dormant (provided the gummy ingredient used is of a waterproofing nature) but without destroying the beneficial character and effect of the stiffening portion of the binder, which afterward during the wearing of the shoe controls the filler layer from being heat-influenced and from shifting in the bottom cavity in response to ordinary conditions of heat and pressure in use on the wearer's foot. Among the solutions may be mentioned the naphthalin solutions of resinous or gummy matter, and a solution containing naphthalin may be used on the roll in the manner above mentioned in connection with the wax. In this case it is capable of very fine fluidity under heat, i. e. finely subdivided so as to be capable of flowing freely and a very light coating on the heated roll or tool serves therefore temporarily to render sticky the resinous matter which may be in the solution or at the exposed top portion of the filler layer in the shoe-bottom. The heat of the roll or tool not only tends to evaporate any moisture which may be present, as explained, but of course quickens or renders active the latent stickiness of the latent sticky component of the filler, as just mentioned, while the roll or tool at the same time serves to apply the superficial solution or substance to quicken and develop the latent stickiness at the surface, as already explained.

A further advantage of my process especially in the respects mentioned results from the way in which the filler is applied in practice. The filler is usually held in a comparativey loose mass or heap in a suitable basin-like receptacle, and the operator takes the hot knife or spatula to lift the required amount into the shoe-bottom cavity, and then quickly spreads it by a back and forth and lateral movement into the confines of the cavity, and this presence of the hot blade underneath the filler as the latter is being lifted and then throughout the mass as it is being spread, and finally by the roll or hot tool on top as it is being smoothed down, results in quickening the gummy component into a highly sticky condition so that the filler layer adheres to the bottom of the cavity as well as having its top surface rendered sticky aided, as explained in the more complete process, by the quickening top dressing or superficial application of the surface substance or solution for adhesion to the outsole when laid.

My invention does not reside solely nor primarily in using a heated tool, but resides primarily in providing the pasty or slimy, mushy kind or type of filler with a waxy, sticky, pitchy, gummy, fatty, element, as set forth, and applying it in connection with heat, so that the tool does not stick or incrust with the filler, but is kept sleek by the waxy component and is given a free slipping movement over the pasty component, while the filler itself is rendered highly sticky, as distinguished from being slow-adhering, and is given a formed or shaped setting by the drying out of the water or other solvent, which results in giving it a top crust or set formation sufficient to hold it in place and permit the sole-laying and further operations much quicker than has heretofore been possible with the so-called paste fillers. My invention makes it practicable to use these fillers cold and yet without delay, because the application of heat evaporates the moisture of the paste so as to give the set condition. A hot blade cannot be used with the ordinary paste filler alone because the paste dries upon the blade and sticks and incrusts there so as to cause the blade to drag the filler along with it and make it practically impossible to smooth the filler down into shape in the shoe-bottom. By the addition to such a filler of the softening component, already explained, the hot tool can then be used with the ordinary paste filler, because of the sleeking element within the paste. Hence, by the introduction of this element into the filler or used in connection with the filler, it becomes possible to employ the hot tool with a paste filler, and thereby drying out and incrusting the layer of paste filler in the shoe, so that the delay which has always heretofore existed is obviated and the shoe can be passed along at once to the next operation in its manufacture. This is one phase of my invention and one great advantage thereof, to wit, with paste fillers or evaporating hardening fillers. Another phase of my invention and an equally important advantage thereof relates to its use with the so-called waxy or gummy and non-evaporating fillers (such for instance as contained in my Patent No. 832,002). By combining with this last mentioned type of filler a pasty or firm-setting component in solution and then applying it in connection with heat, and especially in connection with a heated tool in direct contact with the top surface of the filler layer, the solvent is evaporated or dried out by means of the heat and of the heated tool so as not only to stiffen the filler layer but to convert the said solution into a form or condition where it is no longer responsive to heat, as the firm-setting component or ingredient thereof, having parted with or been separated from its solvent or mobilizing agent, has now assumed, within the filler body, the permanent character of a stiffener. To make this clear, let us suppose that the firm-setting component in solution is simply ordinary water-dissolved paste. The application of the heat, in the manner stated, has operated to simultaneously eliminate the water and bring about a closer union with the pitchy waterproofing ingredient, so that the enveloping and permeating influence of the latter has become paramount and yet is modified by the softening influence of the set paste. The shoe now contains a filler layer which, under ordinary conditions of the shoe's use, is waterproofed and pliable and yet is stiffened or set sufficiently to be non-shiftable in the shoe and non-responsive to ordinary conditions of temperature. The paste-forming component having become thoroughly united with the waterproofing component by the simultaneous evaporation of the water from the paste and the super-melting of the waterproofing ingredient, is no longer accessible to water, so that it cannot thereafter be softened, if the wearer should walk in the wet, for instance.

Further advantages of my invention relate to the manufacture thereof and other points, such as keeping the filler ready for use, etc., but the foregoing explanation of the advantages from the wearer's and shoe-manufacturer's standpoints are the more important and are deemed sufficient for the purposes of this patent. I wish it understood that my invention is of wide scope and capable of application to a wide range of shoe-bottom fillers. For instance, it is applicable to a ready-mixed filler such as disclosed in my last mentioned patent, and on the other hand it is applicable to a filler in which the solution is prepared and sold separately to be mixed with the ground cork at the shoe factory, and it is likewise applicable to an admixture of filler sold dry to be rendered active by means of water (cold, hot, or steam vapor) at the shoe factory. I use the term "softening filler-element" in the claims to designate that which, either as a component or as an accessory material, effects the softening of the filler, i. e., this term denotes the substance which renders the filler plastic enough for laying in the shoe cavity.

Having described my invention, what I claim as new and desire to secure by Letters Patent is:

1. The art of filling shoes, which consists of providing a shoe-filler amenable to a softening filler-element and to heat and having a firm-setting component in solution with a solvent capable of being driven off by heat, softening said filler and rendering the same pliable by a softening filler-element, and applying the filler in a layer to the shoe-bottom cavity in the presence of heat sufficient to drive off at least a portion of the solvent in the process of laying the filler.

2. The art of filling shoes, which consists of providing a shoe-filler amenable to a softening filler-element and to heat and having a firm-setting component in solution with a solvent capable of being driven off by heat, softening said filler and rendering the same pliable by a softening filler-element united with the filler, and applying the filler in a layer to the shoe-bottom cavity in the presence of heat sufficient to drive off at least a portion of the solvent in the process of laying the filler.

3. The art of filling shoes, which consists of providing a shoe-filler amenable to a softening filler-element and to heat and having a firm setting component in solution with a solvent capable of being driven off by heat, softening said filler and rendering the same pliable by introducing a softening element into the filler at the time of laying the filler, and applying the filler in a layer to the shoe-bottom cavity in the presence of heat sufficient to volatilize the solvent and thereby hasten the setting of the firm-setting component.

4. The art of filling shoes, consisting of applying in a thin layer a setting filler in a plastic condition to a shoe-bottom, and then immediately stiffening the top of the laid filler by direct application to said top of means capable of coöperating with the filler to cause the top of the latter to become set more quickly than the rest of the layer.

5. The art of filling shoes, consisting of applying a plastic, setting filler to a shoe-bottom, and then immediately applying to the top of the laid filler a setting and waterproofing treatment to cause the top to become thoroughly waterproof next the outsole.

6. The art of filling shoes, consisting of applying a plastic, setting filler to a shoe-bottom, and then applying a top dressing capable of uniting therewith as a waterproof compound.

7. The art of filling shoes, which consists of incorporating together a sticky, gummy component, a firm setting component in solution and granulated body-material, applying the same in a layer to the shoe bottom cavity, and then applying a top dressing of softening material in connection with heat.

8. The art of filling shoes, which consists of incorporating together a sticky gummy component, a firm-setting component in solution with a solvent capable of being driven off by heat, and granulated body-material, and applying the same in a layer in the cavity of the shoe-bottom by means of a tool having sufficient heat to volatilize said solvent and quicken said sticky gummy component and thereby hasten the setting of said firm-setting component and develop a permanent union between the sticky component and the firm-setting component at the time of filler-laying.

9. The herein described process, which consists of applying to a shoe-bottom a shoe filler amenable to a softening filler-element and to heat and containing a firm-setting component in solution with a solvent capable of being driven off by heat, softening said filler until pliable by the agency of a heat-responsive softening element, and applying a drying heat to the top surface of the filler layer when in a shoe-bottom cavity sufficient to volatilize the solvent.

10. The herein described process, which consists of providing a shoe-filler amenable to a softening filler-element and to heat and containing a firm-setting component in solution with a solvent capable of being driven off by heat, softening said filler until pliable by the agency of a heat-responsive softening element in union with the filler, placing the filler in the cavity of the shoe bottom and applying a drying heat to the top surface of the filler layer when in a shoe-bottom cavity sufficient to volatilize the solvent.

11. The herein described process, which consists of providing a shoe-filler amenable to a softening filler-element and to heat and containing a firm-setting component in solution with a solvent capable of being driven off by heat, softening said filler until pliable by the agency of a heat-responsive softening element, laying the softened filler in a shoe-bottom cavity and simultaneously applying a drying heat to the top surface of the filler layer sufficient to evaporate the solvent and quicken the setting of the filler.

12. The art of filling shoe bottoms, which consists of providing a filler material having a firm setting component in solution, softening and rendering the same pliable by introducing a softening element as a part of the filler, laying the softened filler in the shoe bottom cavity and then applying a top dressing of softening material in connection with heat to the top surface of the filler layer when in the shoe bottom cavity.

13. The herein described art, which consists of providing a shoe-filler having a firm-setting component in volatile solution, rendering said filler pliable by introducing a softening element as a part of the filler and laying the filler in the shoe-bottom cavity irrespective of whether said softener is introduced before said laying of the filler or at the time of said laying, and applying heat to the top surface of said filler layer.

14. The art of filling shoes, which consists of incorporating a softening, sticky component into a filler containing a predominating amount of firm setting material in a volatile solution which normally maintains the stickiness of said sticky component latent on account of its solvent, applying the filler thus modified to the shoe bottom cavity, and then applying a heated tool over the top surface of the filler layer in said cavity with heat sufficient to develop said latent stickiness by volatilizing the solvent.

15. The art of filling shoes, which consists of rendering the sticky softening component of the filler dull and less than normally sticky by mingling therewith a moistening solution, applying this mixture to the shoe bottom cavity, and then applying a heated tool to the top surface of the filler layer in said cavity, until the dulling effect of the solution is neutralized and the stickiness of the softening component is developed.

16. The art, which consists of modifying a normally firm setting pasty filler by introducing thereinto a fluid softener, laying the filler in the shoe-bottom cavity and applying heat to the top surface of the filler when in the shoe bottom cavity with heat sufficient to dry out said pasty filler appreciably and quicken the modified filler.

17. The herein described process, which consists of modifying a normally firm-setting pasty filler by introducing thereinto a fluid softener, laying the filler in the shoe-bottom cavity and stiffening the filler by applying a hot tool in direct contact with the top surface of the filler when in a shoe-bottom cavity.

18. The art of filling shoes, containing the following essential steps: providing a filler containing a latent sticky component and which lacks the desired ultimate active stickiness before being applied to the shoe, introducing thereinto a fluid softener, laying said filler in a shoe bottom cavity irrespective of whether this laying step in the process is performed before, after, or at the time of the introduction of said softener, and quickening the laid filler to its desired condition of ultimate active stickiness by a top-surface treatment consisting at least in part of a superficial application of a coating substance capable of quickening and developing said latent stickiness.

19. The herein described process, which consists of modifying a normally firm-setting pasty shoe-filler by introducing thereinto a fluid softener, laying said filler in a shoe-bottom cavity irrespective of whether this step in the process is performed before, after, or at the time of the introduction of said softener, and stiffening and quickening the laid filler by applying directly to the top surface thereof a hot tool coated with waxy substance.

20. In the art of filling shoes, first providing a filler containing a latent sticky component and which lacks the desired ultimate active stickiness before being applied to the shoe, applying the filler to the shoe bottom cavity, and rendering said latent stickiness active by the aid of heat so that it may stick to the leather of the shoe cavity.

21. The art of filling shoes, which consists of incorporating together a gummy, sticky compound, a thick moisture-absorbing paste and granulated body-material in such proportions that the sticky compound is held subdivided in minute free particles separated by and in the moisture laden paste, whereby the adhesive and sticky property of the former is rendered inactive, then laying said filler in the shoe bottom cavity and applying a heated leveling tool over the surface thereof so as to evaporate the moisture from the light coating on the granulated portions of the filler, and simultaneously develop the stickiness and stiffen the surface of the laid filler.

22. The art of filling shoes, which consists of applying the shoe bottom filler to the shoe bottom cavity and then, as a separate act and step immediately producing a stiffening of the top surface thereof to an incrusted self-sustaining condition.

23. The art of filling shoes, which consists of applying the shoe bottom filler to the shoe bottom cavity and immediately leveling said filler to the desired smooth top surface, and simultaneously stiffening said surface to a set, incrusted condition.

24. The art of filling shoes, which consists of applying the shoe bottom filler to the shoe bottom cavity and immediately leveling said filler to the desired smooth top surface, and simultaneously stiffening said surface and rendering said surface sticky.

25. In the art of filling shoes, employing the following two steps, but without limiting the method to the order of said steps, viz; (1) admixing with a filler containing granulated body material and a thick moisture absorbing paste an oily softening ingredient capable of supplying the sleeking element in the presence of said body material when applied in the shoe bottom cavity, (2) applying the filler to said cavity by means of a heated tool, irrespective of whether this step takes place before said admixing or at the time of said admixing.

In testimony whereof, I have signed my name to this specification, in the presence of two subscribing witnesses.

ANDREW THOMA.

Witnesses:
GEO. H. MAXWELL,
JAMES R. HODDER.